United States Patent [19]

Stein et al.

[11] 4,250,511
[45] Feb. 10, 1981

[54] THERMAL TRANSFER COLOR PRINTER

[75] Inventors: William W. Stein, Beaverton; Robert W. Burns, Newberg, both of Oreg.

[73] Assignee: Tektronix, Inc., Beaverton, Oreg.

[21] Appl. No.: 67,486

[22] Filed: Aug. 16, 1979

Related U.S. Application Data

[63] Continuation of Ser. No. 910,170, May 30, 1978, abandoned.

[51] Int. Cl.³ .............................................. G01D 15/10
[52] U.S. Cl. ................................ 346/76 PH; 101/93; 178/30; 219/216; 346/46; 346/139 C
[58] Field of Search ............... 346/76 PH, 139 C, 46; 101/93; 178/30; 219/216, 260; 197/172

[56] References Cited

U.S. PATENT DOCUMENTS

| | | | |
|---|---|---|---|
| 3,453,648 | 7/1969 | Stegenga | 346/76 PH |
| 3,596,055 | 7/1971 | Elston | 219/260 |
| 3,716,125 | 2/1973 | Ploeger, Jr. et al. | 197/172 |
| 3,726,212 | 4/1973 | Combs | 346/76 PH X |
| 3,961,121 | 6/1976 | Warsager | 197/172 X |
| 3,984,809 | 10/1976 | Dertouzos et al. | 346/76 PH |

FOREIGN PATENT DOCUMENTS

| | | |
|---|---|---|
| 1390845 | 4/1975 | United Kingdom . |
| 1402682 | 8/1975 | United Kingdom . |
| 1462257 | 1/1977 | United Kingdom . |
| 1499153 | 1/1978 | United Kingdom . |

OTHER PUBLICATIONS

UK Patent Application No. 2,010,187, Termcom, published 06001979.

Primary Examiner—Richard A. Wintercorn
Attorney, Agent, or Firm—John D. Winkelman

[57] ABSTRACT

A single pass multicolor thermal transfer printer for recording color images on plain paper by transferring spots of different colored materials from a carrier sheet as it and a sheet of paper are moved across a printhead in contiguous relation. The printhead includes a plurality of individual thermal elements that are selectively energized in timed relation to transfer colored materials from discrete areas of the carrier to the paper as the sheets pass over the printhead. The carrier includes separate, repeating patterns of four different color materials—three primary colors plus black—permitting the formation of multicolor images by energizing the appropriate elements as areas of the desired color materials are moved into registration with them.

10 Claims, 5 Drawing Figures

THERMAL TRANSFER COLOR PRINTER

CROSS-REFERENCE TO RELATED APPLICATION

This is a continuation of application Ser. No. 910,170, filed May 30, 1978, and now abandoned.

BACKGROUND OF THE INVENTION

The present invention relates generally to thermal printing systems, and in particular to a single pass multicolor thermal transfer printer.

In thermal transfer printing, an ink or other record-forming material is selectively transferred from a carrier to a record medium, which may be ordinary paper, by applying thermal energy to localized areas of the carrier. Information frequently is printed on the record medium as an arrangement of colored dots or other discrete elements. For example, U.S. Pat. No. 3,453,648 to Stegenga describes a system that includes a number of printing modules, each with thirteen strip-like heating elements. Line segments defining any desired alphanumeric character can be transferred to a record medium from an adjacent ink-coated carrier sheet by energizing the appropriate heating elements in a module. The different modules are mounted in a fixed printing head, one at each potential character position in a line.

The thermal printing unit disclosed in U.S. Pat. No. 3,596,055 to Elston includes a printhead having a 5×5 matrix of dot-like semiconductor mesas on one face. The mesas can be selectively heated to an elevated temperature by logic circuitry in the unit to produce a character-defining pattern of hot spots on the printhead face. In use, a motor-driven carriage steps the printhead along a pigmented carrier ribbon supported between the printhead face and a record medium. Certain mesas are energized by the logic circuitry at each successive carriage position, causing spots of pigment forming dot matrix characters to transfer from the carrier ribbon to the record medium. A third type of thermal transfer printer, typified by U.S. Pat. No. 3,984,809 to Dertouzos et al., included a fixed printhead having a single row of thermal elements. The row extends across contigously moving webs of carrier and record media, perpendicular to their direction of travel. By selectively energizing the elements as the webs move past, closely spaced rows of dots are imprinted on the record medium to produce alphanumeric characters or other information in two-dimensional dot patterns.

Two approaches have been used to produce multicolor images by thermal transfer printing. One is a multiple pass method in which a record medium is printed several times with the same printhead using a different color transfer carrier each time. Another is the approach shown in the above-mentioned Dertouzos et al. patent—the record medium is moved in succession past three printheads, each associated with a different color transfer carrier.

SUMMARY OF THE INVENTION

A principal object of the present invention is to provide an improved, single pass multicolor thermal transfer printer employing a unitary carrier for the different color record-forming materials. In one exemplified embodiment, such a printer includes an elongate printhead and means for transporting carrier and record medium webs over the head in contiguous relation. The printhead has a double row of thermal elements constituting a rank of rhomboid cells that extends across the carrier web. Each cell includes four thermal elements—one for each of three primary colors plus black—and forms the basic unit for producing a multicolor record. As the moving webs pass over the printhead, its thermal elements are selectively energized by associated logic circuitry to transfer spots of different color materials from the carrier to the record medium. The various transferable color materials are arranged on the carrier in a mosaic pattern of adjoining rhomboid cells matching those of the printhead. By maintaining the carrier web and printhead in alignment, any desired color record can be produced by energizing the appropriate thermal elements in synchronization with the passage of the carrier sheet over them.

In another embodiment of the invention, the transferable color materials are formed as a repeating series of transverse stripes on the carrier web. The printhead in this case may have a single row of thermal elements, any of which may be energized to transfer a spot of a particular color as a stripe of that color is carried over the head. To permit the deposit of any color at a given location on the record medium, the carrier web is advanced at a faster rate than the record web in this embodiment.

DETAILED DESCRIPTION OF ILLUSTRATIVE EMBODIMENTS

Figure 1:
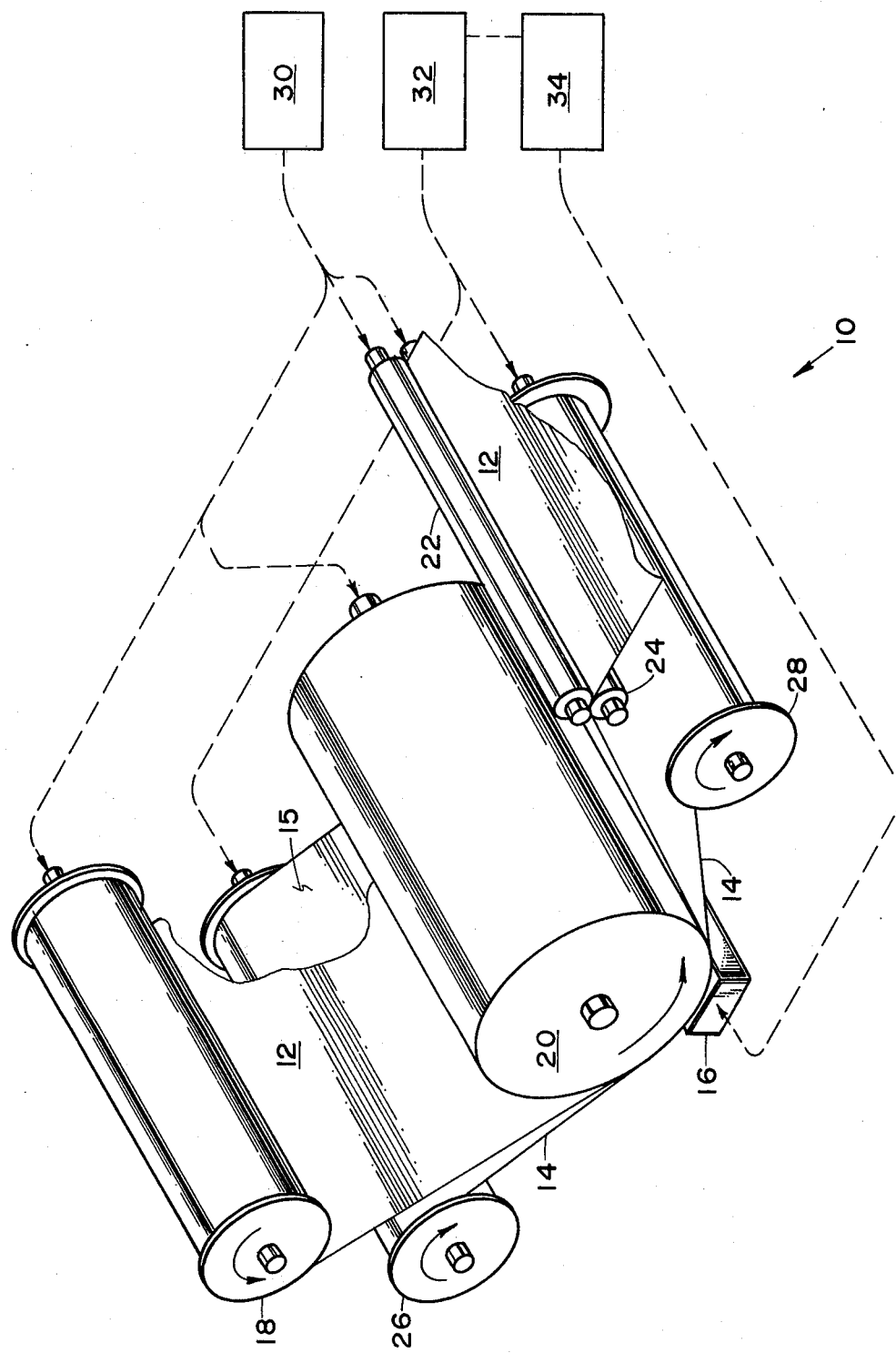
FIG. 1 is an illustrative representation of a thermal transfer color printer embodying the present invention.

Referring first to FIG. 1, a single pass multicolor thermal transfer printing system exmplifying the present invention is indicated generally at 10. In system 10, information-depicting patterns of colored spots are formed on a traveling web 12 of plain paper or the like as it and a simultaneously moving carrier web 14 are drawn across an elongate printhead 16. Record medium web 12 is fed from a supply reel 18, passes under a backing roll 20, then through a nip between a pair of oppositely-rotating outfeed rollers 22, 24. The carrier web, which bears a pattern of different color record-forming materials on its upper surface 15, advances from a supply reel 16 to a takeup reel 28, traveling over printhead 16. As they pass under backing roll 20, the record medium and carrier webs come into contact and are pressed together throughout their widths between the printhead and backing roll. Roll 20, reels 18, 26, 28 and rollers 22, 24 are rotatably mounted on suitable supporting framework, which for clarity is omitted from the drawings. Printhead 16 also is mounted on the framework, in a manner permitting adjustment of the pressure exerted against webs 12, 14, and of its alignment relative to the carrier web.

Supply reel 18, backing roll 20 and outfeed rollers 22, 24 are powered by suitable drive means 30, with drive means 32 performing a similar function for supply and takeup reels 26, 28 respectively. As will be discussed below in greater detail, webs 12 and 14 are moved across printhead 16 at the same rate in one mode of operation and at different rates in another mode. Accordingly, drive means 30 and 32 include means for varying the relative travel rates of the two webs. Printhead 16, which includes a plurality of thermal elements, is operatively connected to power supply and control logic circuitry 34 for selective activation of the elements in synchronization with the movement of carrier web 14. To permit such synchronization, circuitry 34 is suitably linked to drive means 32 as indicated.

Figure 2:
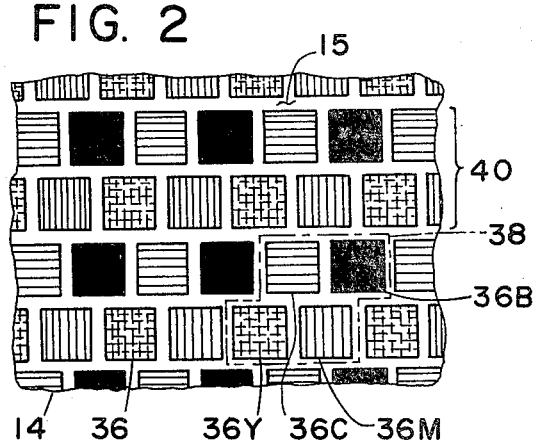
FIG. 2 is a plan view on an enlarged scale of a color transfer carrier according to one embodiment of the invention.

According to one embodiment of the invention, carrier web 14 includes a mosaic pattern of different thermotransferable color record-forming materials, or "inks", on the surface that comes into contact with record medium web 12, i.e., upper surface 15. Such a pattern is shown (greatly magnified) in FIG. 2. The illustrated pattern includes discrete, separated spots 36 of four different colored inks arranged in rhomboid cells, one of which is indicated in dash-dot outline at 38. Each cell contains a yellow ink spot 36Y, a cyan spot 36C, a magenta spot 36M, and a spot 36B of black ink. The cells are disposed side by side in parallel ranks that extend across web 14, i.e., perpendicular to its direction of travel. One of the ranks is identified in FIG. 2 by bracket 40.

Suitable color record-forming materials include known compositions of the type used in conventional sublimation printing, as well as those that soften or melt when heated to a certain temperature and transfer to a record medium by differential adhesion or diffusion. The carrier web material preferably is one having good heat resistance and thermal transfer properties, and should be as thin as is compatible with the mechanical strength and dimensional stability requirements of the application. Typical carrier materials include Mylar polyester films, polyester-coated paper, and silicone-coated papper ranging from 1 to 3 mils thick. The thermotransferable color materials are applied to the carrier by offset, screen stencil, or other conventional printing methods capable of producing the required spot pattern.

Figure 3:
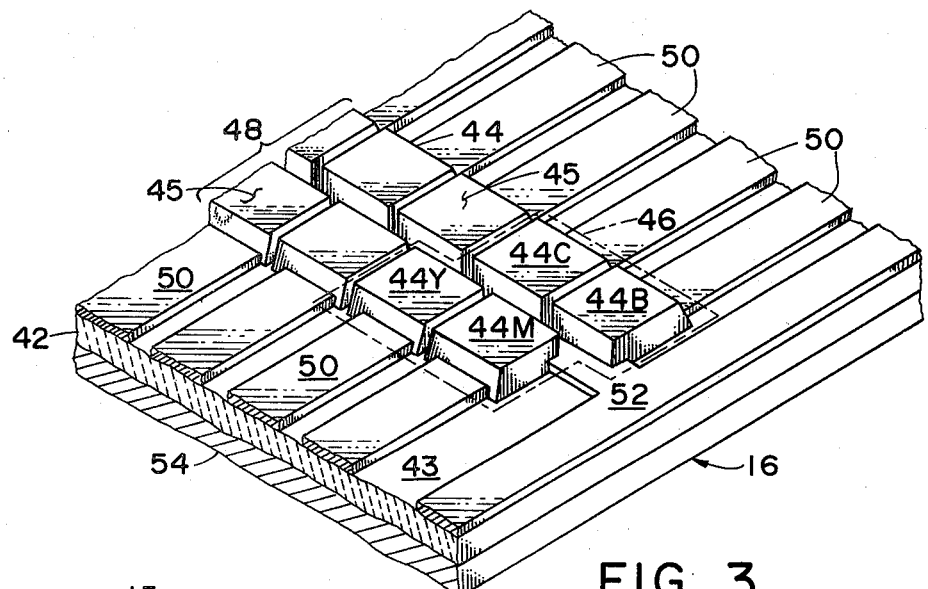
FIG. 3 is an enlarged isometric view showing a portion of a printhead used with the FIG. 2 carrier.

Referring next to FIG. 3, printhead 16 comprises a substrate member, or strip, 42 of heat resistant insulating material, preferably a low thermal conductivity ceramic. A double row of thermal elements 44 extends lengthwise along the upper surface 43 of the strip. The thermal elements are similar in planform configuration and size to thermotransferable spots 36 on carrier web surface 15, and also are arranged in rhomboid cells of four. Each element 44 in a printhead cell is assigned to the same color as the corresponding ink spot in carrier web cell. Thus, for example, the cell indicated in dash-dot outline at 46 includes a "yellow" thermal element 44Y, a "cyan" element 44C, a "magenta" element 44M and a "black" thermal element 44B. Printhead 16 includes a single rank 48 of such cells.

Each of the thermal elements on strip 42 is connected between two electrical conductors on surface 43—a supply lead 50 and a common bus 52. The bus, supply leads, and thermal elements may be formed on the substrate using well-known thick film or thin film techniques. A suitable method is discosed, for example, in U.S. Pat. No. 4,037,315 to Stapleton et al. After forming the conductors and thermal elements, strip 42 is bonded to a metal support plate 54 that includes mounting and positioning elements (not shown) for the printhead.

In operation of printing system 10 (FIG. 1), circuitry 34 energizes selected thermal elements 44 in synchronization with the movement of webs 12 and 14 across printhead 16. The elements are energized by passing electric current pulses through them via bus 52 and their individual supply leads 50. During each pulse, an energized element is momentarily heated to an elevated temperature, producing a "hot spot" on its upper surface 45. Heat from the element passes through web 14 and causes colored material to transfer from a spot 36 overlying the element to record medium web 12.

Multicolor displays are produced by energizing selected groups of thermal elements in rank 48 as each rank 40 of 4-spot cells on carrier web 14 passes in succession over the printhead. As will be understood, it is important to maintain good registration between the carrier web and printhead in this mode of operation so that, for example, a black spot is tranferred from web 14 when the corresponding "black" thermal element is energized. Such registration may be achieved in a number of ways, for example by a servo-driven printhead alignment mechanism that responds to timing marks printed on the carrier web. Alternatively, a sprocket-type web transport mechanism may be used. It also will be evident that webs 12 and 14 should travel across printhead 16 at the same speed if good image quality is to be obtained. This is suitably accomplished by adjusting drive means 30 and 32 to provide essentially identical travel rates for the two webs.

In a printing system incorporating a printhead and mosaic patterned web of the type just described, image resolution is limited by the size of the printhead/color spot cells that form the basic image-producing unit. By way of example, the color spots on web 14 and 9 mils square with 1 mil spaces between them. Printhead 16 has thermal elements of a similar size. Because the distance between spots of the same color in adjoining cells is 11 mils, the maximum attainable resolution is about 50 color elements/inch worst case (images of one color). Higher resolutions can of course be realized through corresponding reductions in the sizes of the printhead and color spot cells.

Figure 4:
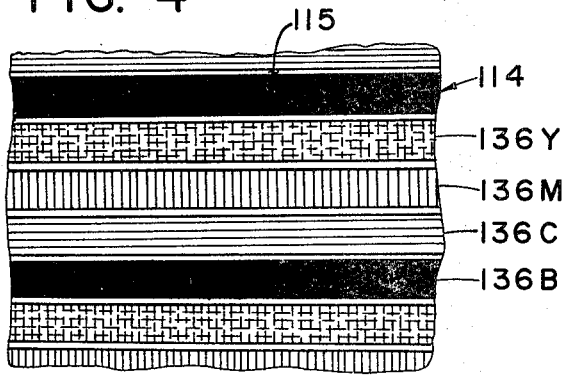
FIG. 4 is a plan view on an enlarged scale of a color transfer carrier according to another embodiment of the invention.

Now referring to FIG. 4, a carrier web 114 provided in accordance with another embodiment of the invention includes a pattern of parallel stripes 136 of different color record-forming materials on its upper surface 115. The stripes, which extend perpendicular to the web's direction of travel, are disposed in a repeating series of four different colors—one each of three primaries plus black. As shown in the figure, each series includes a yellow ink stripe 136Y, a magenta stripe 136M, a cyan stripe 136C and a black ink stripe 136B. Carrier web 114 is fabricated by the same method, using the same materials, as previously-described web 14.

Figure 5:
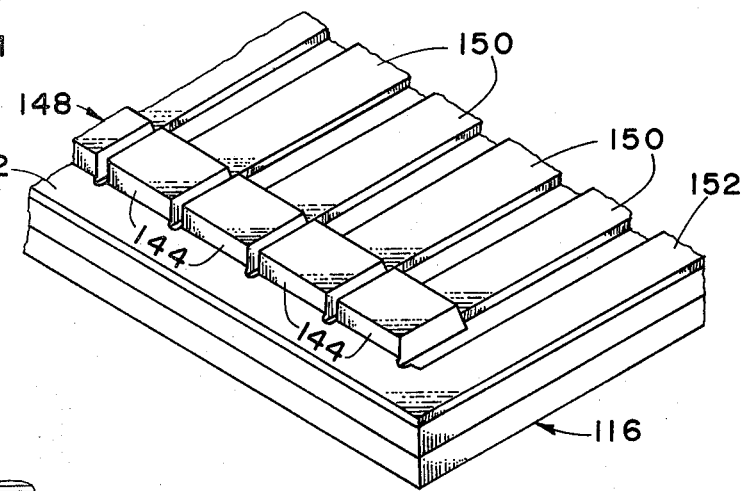
FIG. 5 is an enlarged isometric view showing a portion of a printhead usable with the FIG. 4 carrier.

As will be explained shortly, web 114 may be used in conjunction with a printhead of the type shown in FIG. 3. However, a simpler printhead 116 (FIG. 5) having a single row of thermal elements can be used instead. The single row, or rank, 148 of elements 144 extends lengthwise along the upper surface of the printhead's substrate, each element being connected between a supply lead 150 and a common bus 152. Printhead 116 is fabricated by the same techniques used to produce printhead 16.

In operation of printing system 10 with carrier web 14 replaced by transversely-striped web 116, drive means 30 and 32 are adjusted to move the carrier web across printhead 16 (or 116) at a rate at least four times that of record medium 12. Power supply and control logic circuitry 34 energizes selected thermal elements 44 (or 144) in synchronization with the movement of the webs to transfer spots of color material from stripes 136 to the record medium. By energizing a thermal element at the appropriate time, a spot of any one or more of the four colors can be deposited within a region of web 12 overlying that element. Thus it will be seen that the printhead's thermal elements 44 (or 144) are not individually assigned to transfer particular color spots in this mode of operation.

The use of a striped carrier web in accordance with the invention provides several benefits. Better image resolution is possible because spots of the same color can be deposited much closer together. Color saturation in the printed image is much improved for the same reason. Higher quality color reproduction results from the ability to deposit spots of different colors at the same location on the record medium.

As used herein, the term "record-forming material" means any material that will establish information on another by thermal transfer, and the term "record medium" means any material on which the information can be established by the record-forming material.

The present invention has been described in accordance with the best mode presently contemplated for its practice. It will be understood, however, that the exemplified embodiments are merely illustrative and numerous variations are possible without departing from the scope of the invention as claimed. For example, although the specific embodiments describe four-color printing systems (three primary colors plus black) two- and three-color versions of system may be provided by appropriate modifications of the carrier web ink patterns, thermal element color assignments, web travel rates, control logic, etc. In addition, a printing system may be provided in which the record medium is held stationary and the printhead is moved over it and an intermediate carrier sheet. Such changes are well within the ability of those ordinarily skilled in the relevant art.

We claim as our invention:

1. Thermal transfer printing apparatus, comprising
a stationary printhead having a plurality of individually energizable thermal elements arranged in a row,
a carrier sheet supported for movement across said printhead in a direction substantially perpendicular to said row with one face of the sheet being maintained in heat transfer relation with said thermal elements, said sheet bearing a plurality of different color record-forming mateials arranged in a repeating series of stripes extending transverse to said direction,
means for supporting a record medium on the opposite face of said carrier sheet for movement in said direction,
drive means for propelling said carrier sheet and record medium across the printhead at different rates, with the rate of movement of the carrier sheet exceeding that of the record medium,
means for energizing selected thermal elements in timed relation to the movement of said carrier sheet to transfer spots of color record-forming materials from said sheet to the record medium.

2. The apparatus of claim 1, wherein the carrier sheet's rate of movement exceeds that of the record medium by a factor at least equal to the number of different color record-forming materials borne by the carrier sheet.

3. The apparatus of claim 1, wherein said color record-forming materials comprise materials capable of transferring to a record medium by heat-induced sublimation.

4. The apparatus of claim 1, wherein said carrier sheet is configured as a web.

5. Thermal transfer printing apparatus, comprising
a stationary printhead having a plurality of individually energizable thermal elements arranged in multiple rows,
a carrier sheet supported for movement across said printhead in a direction substantially perpendicular to said rows with one face of the sheet being maintained in heat transfer relation with said thermal elements, said sheet bearing a plurality of different color record-forming materials arranged in a mosaic pattern of spots,
means for supporting a record medium on the opposite face of said carrier sheet for movement in said direction,
drive means for propelling said carrier sheet and record medium across the printhead, and
means for energizing selected thermal elements in timed relation to the movement of said carrier sheet to transfer spots of color record-forming materials from said sheet to the record medium.

6. The apparatus of claim 5, wherein the thermal elements in said rows are arranged in a rank of cells, each cell including a different element for each different color record-forming material borne by the carrier sheet, and wherein the spots of color record-forming materials on the carrier sheet are arranged in similar cells.

7. The apparatus of claim 6, wherein said carrier sheet includes a plurality of rhomboid cells, each containing one spot each of four different color record-forming materials.

8. The apparatus of claim 5, wherein said carrier sheet and record medium are propelled across the printhead at substantially the same rate.

9. The apparatus of claim 5, wherein said color record-forming materials comprise materials capable of transferring to a record medium by heat-induced sublimation.

10. The apparatus of claim 5, wherein said carrier sheet is configured as a web.

* * * * *